C. L. SLADINSKA.
VINE STRIPPING MECHANISM.
APPLICATION FILED AUG. 29, 1911. RENEWED FEB. 27, 1917.
1,237,565.
Patented Aug. 21, 1917.
2 SHEETS—SHEET 2.
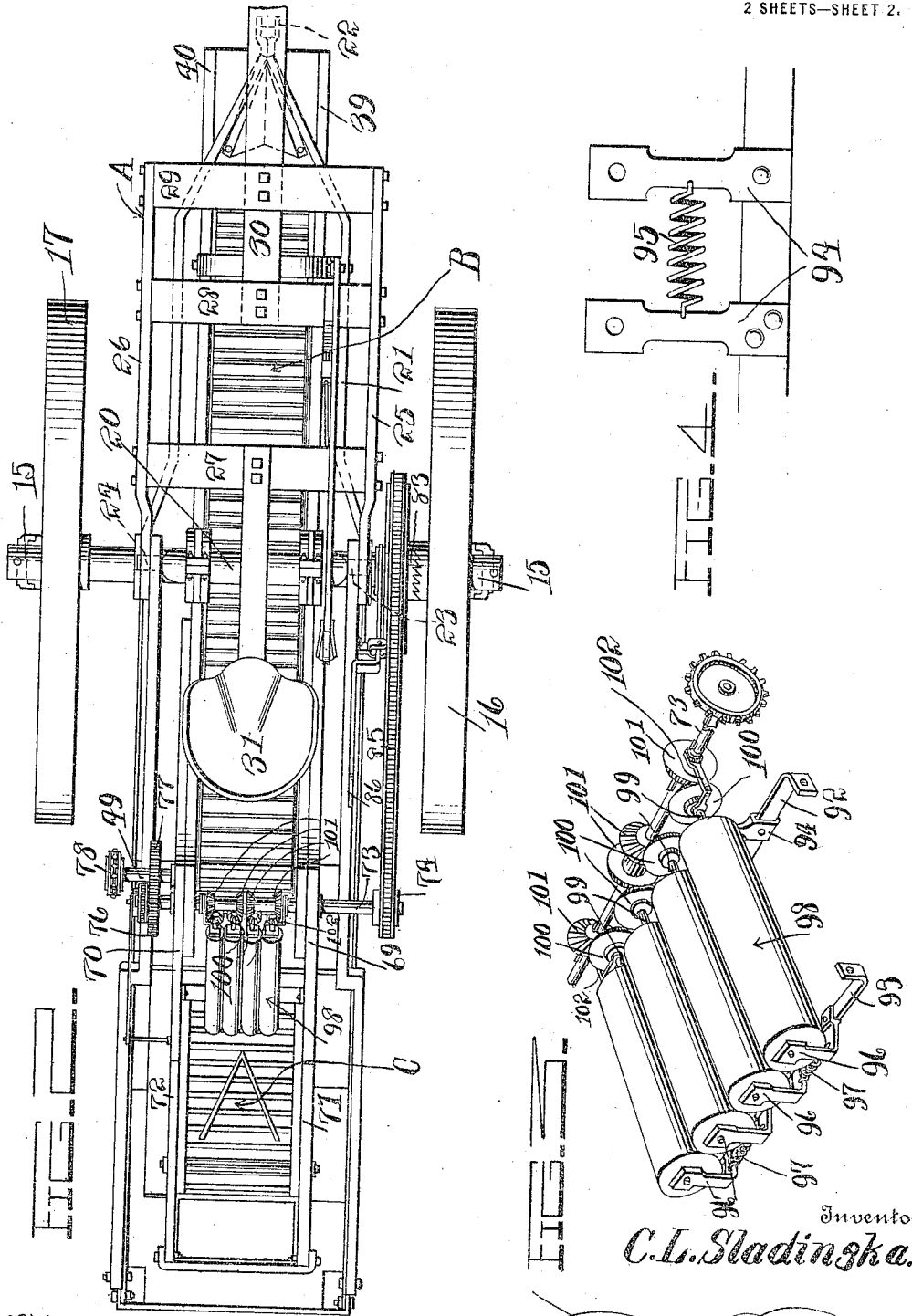

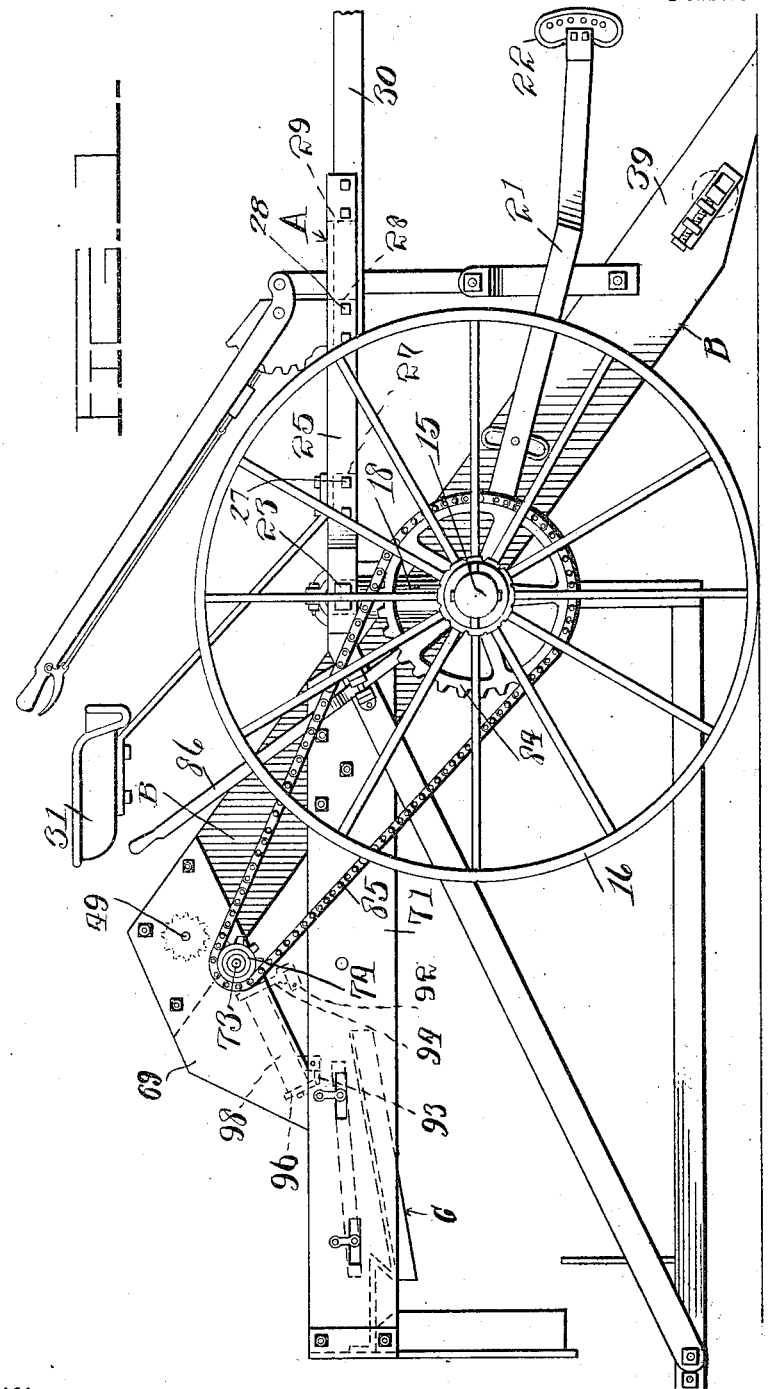

UNITED STATES PATENT OFFICE.

CHARLES L. SLADINSKA, OF FOUNTAIN CITY, WISCONSIN.

VINE-STRIPPING MECHANISM.

1,237,565.     Specification of Letters Patent.     Patented Aug. 21, 1917.

Application filed August 29, 1911, Serial No. 646,601. Renewed February 27, 1917. Serial No. 151,376.

*To all whom it may concern:*

Be it known that I, CHARLES L. SLADINSKA, a citizen of the United States, residing at Fountain City, in the county of Buffalo, State of Wisconsin, have invented certain new and useful Improvements in Vine-Stripping Mechanism; and I do hereby declare the following to be a full, clear, and exact description of the invention, such as will enable others skilled in the art to which it appertains to make and use the same.

This invention relates to vine stripping mechanisms.

The object of the invention resides in the provision of a vine stripping mechanism adapted to be associated with a potato digger for stripping the vines from the potatoes after the latter have been delivered thereto by the elevator of the potato digger.

With the above and other objects in view the invention consists in the details of construction and in the arrangement and combination of parts to be hereinafter more fully described and particularly pointed out in the appended claim.

In describing the invention in detail reference will be had to the accompanying drawings, wherein like characters of reference denote corresponding parts in the several views, and in which.

Figure 1 is a side elevation of a potato digger having the improved vine stripping mechanism associated therewith, Fig. 2, a plan view of what is shown in Fig. 1, Fig. 3, a detail perspective view of the vine stripping mechanism removed, Fig. 4, a detail view showing the yielding brackets which support the upper end of the coöperating pairs of rolls of the vine stripping mechanism.

Referring to the drawings, 15 indicates an axle which has journaled on its respective ends traction wheels 16 and 17. This axle 15 is provided with an intermediate arched or U-shaped portion including parallel arms 18 and a connecting member 20. Pivotally mounted upon opposite ends of the axle 15 are the inner ends of the arms of a forked draft bail 21, said bail carrying at its outer end a clevis 22 for the proper connection of the draft animal through the medium of which latter the machine is drawn along the ground. The axle is provided at each end of the connecting member 20 with lateral extensions 23 and 24 upon which extensions is supported the inner end of a frame A which includes side members 25 and 26 and cross connecting members 27, 28 and 29. Supported by the cross connecting members 28, and 29 in any suitable manner is the inner end of a tongue 30, while suitably supported upon the cross member 27 is a seat 31 for the use of the operator. Pivotally supported upon opposite ends of the connecting member 20 is an elevator or conveyer B which includes side members 39 and 40 between the lower ends of which latter is mounted a digging shovel adapted to enter the potato hills as the machine is moved along the ground and force the potatoes upon the conveyer B. The detail construction of the conveyer or elevator B is fully described in my copending application filed March 9, 1911, and serially numbered 613,301 and no extended reference thereto will be made herein. Journaled between the side members 39 and 40 at the upper end of the latter is a shaft 49 which has the end thereof adjacent the side member 40 extended and fixed upon this extension of the shaft 49 is a gear wheel 77, while the extreme outer end of said extension has fixed thereon a sprocket wheel 78 which is adapted for connection with a loading device or other mechanism when desired. Secured to the outer faces of the side members 39 and 40 respectively are downwardly and rearwardly inclined frame members 69 and 70, the lower ends of which rest upon the upper edges of additional frame members 71 and 72, and the inner ends of these latter are securely bolted to the outer face of the side members 39 and 40 respectively. Journaled between the frame members 69 and 70 is a shaft 73 which has the end thereof adjacent the member 69 extended and fixed upon this extension is a sprocket wheel 74. The end of the shaft 73 adjacent the frame member 70 is also extended, and fixed on this extension is a gear wheel 76 which meshes with the gear wheel 77 on the shaft 49.

The vine stripping mechanism proper includes bars 92 and 93, the former of which connects the frame members 69 and 70 and the latter the frame members 71 and 72, the bar 92 being at a greater elevation than the bar 93 so as to position the vine stripping mechanism at the proper incline to deliver the potatoes to a sifting mechanism C. Mounted upon the bar 92 are brackets 94 which are arranged in pairs, the outermost bracket of each pair being pivotally connected to the bar 92. Each pair of brackets 94 are connected together by means of a spring 95 whereby the outermost bracket of each pair is yieldingly held against movement away from the other bracket of said pair. Mounted upon the bar 93 are brackets 96 arranged in pairs, the outermost bracket of each pair being pivotally connected to the bar 93. Each pair of brackets 96 are connected together by means of a spring 97 whereby the outermost bracket 96 of each pair is yieldingly held against movement away from the other bracket of said pair. Journaled between corresponding brackets 94 and 96 are stripping rolls 98 which have their trunnions passing through the bracket 94 extended as at 99 and mounted on each of the extensions 99 is a beveled gear 100. These beveled gears 100 are disposed in proximity to the shaft 73 and mounted upon this shaft in mesh respectively with the beveled gears 100 are beveled gears 101. These beveled gears 101 are arranged in oppositely disposed pairs and the outermost beveled gear of each pair is splined upon the shaft 73. In order to move the outermost beveled gears 101 longitudinally of the shaft 73 in unison with the movement of the respective gears 100, the extended trunnions of the outermost stripping rolls are connected with the hub of the outermost beveled gears 101 by means of angle bars 102.

By this construction it will be apparent that as the outermost stripping rolls 98 are moved away from their adjacent rolls the outermost beveled gears 100 and 101 will move in unison by reason of the fact that both beveled gears are connected with the trunnion extension 99. This unitary movement of the outermost beveled gears 100 and 101 will of course always maintain said gears in mesh and effect the correct operation of the stripping mechanism.

The hub of the traction wheel 16 is so constructed at its inner end as to constitute one member of a clutch connection and slidably mounted on the axle 15 between the traction wheel 16 and the arm 18 of the arched portion of said axle is a clutch member 83, adapted to coöperate with the inner end of the hub of the traction wheel 16 so as to impart rotation to the clutch member 83 as desired. Fixed upon this clutch member 83 is a sprocket member 84 in alinement with the sprocket wheel 74 on the shaft 73 and traveling on said sprocket wheels 74 and 84 is a sprocket chain 85. The clutch member 83 is adapted to be thrown into and out of engagement with the hub of the traction wheel 16 by means of a hand lever 86 which is suitably connected to said clutch member 83.

By this construction it will be apparent that when the clutch member 83 is thrown into operative engagement with the hub of the wheel 15, said clutch member 83 and sprocket wheel 84 will be rotated and this rotation will be imparted by means of the sprocket chain 85 and sprocket wheel 84 to the shaft 73, the rotation of this last named shaft, through the medium of the various connections heretofore described, serving to operate the vine stripping mechanism so as to clear the potatoes delivered to the vine stripping mechanism by the conveyer B, of all foliage and earth. It will also be apparent that the rotation of the shaft 73 will by reason of the gear connections 76 and 77 rotate the shaft 49 and drive the elevator or conveyer B as fully described in my copending application.

What is claimed is:

As an article of manufacture, a stripping mechanism for harvesting machine comprising a pair of parallel bars, a series of L-shaped brackets mounted on one of the bars in spaced series, each alternate one of the brackets being pivotally mounted on the bar and each other alternate one being rigidly secured thereto, vertical brackets mounted on the other of the parallel bars, each alternate bracket being pivotally mounted on the bar, each other alternate bracket being rigidly connected thereto, a spring connecting each rigid bracket with a pivoted bracket, stripping rollers rotatably mounted in their respective pairs of L-shaped and vertical brackets, a drive shaft disposed in parallel relation with the last named bar and having mounted thereon slidable and rigid pinions, the adjacent end of each of the said rollers having a pinion meshing with one of the pinions of the drive shaft, and means loosely connecting each of the movable pinions to the pinion of the corresponding roller whereby the said pinion will move when the roller moves.

In testimony whereof, I affix my signature, in presence of two witnesses.

CHARLES L. SLADINSKA.

Witnesses:
F. J. FUGINA,
MYRTLE SEHRLICH.

Copies of this patent may be obtained for five cents each, by addressing the "Commissioner of Patents, Washington, D. C."